Aug. 20, 1935.     H. H. V. STANLEY     2,012,145
CINEMATOGRAPH APPARATUS
Filed Aug. 25, 1932
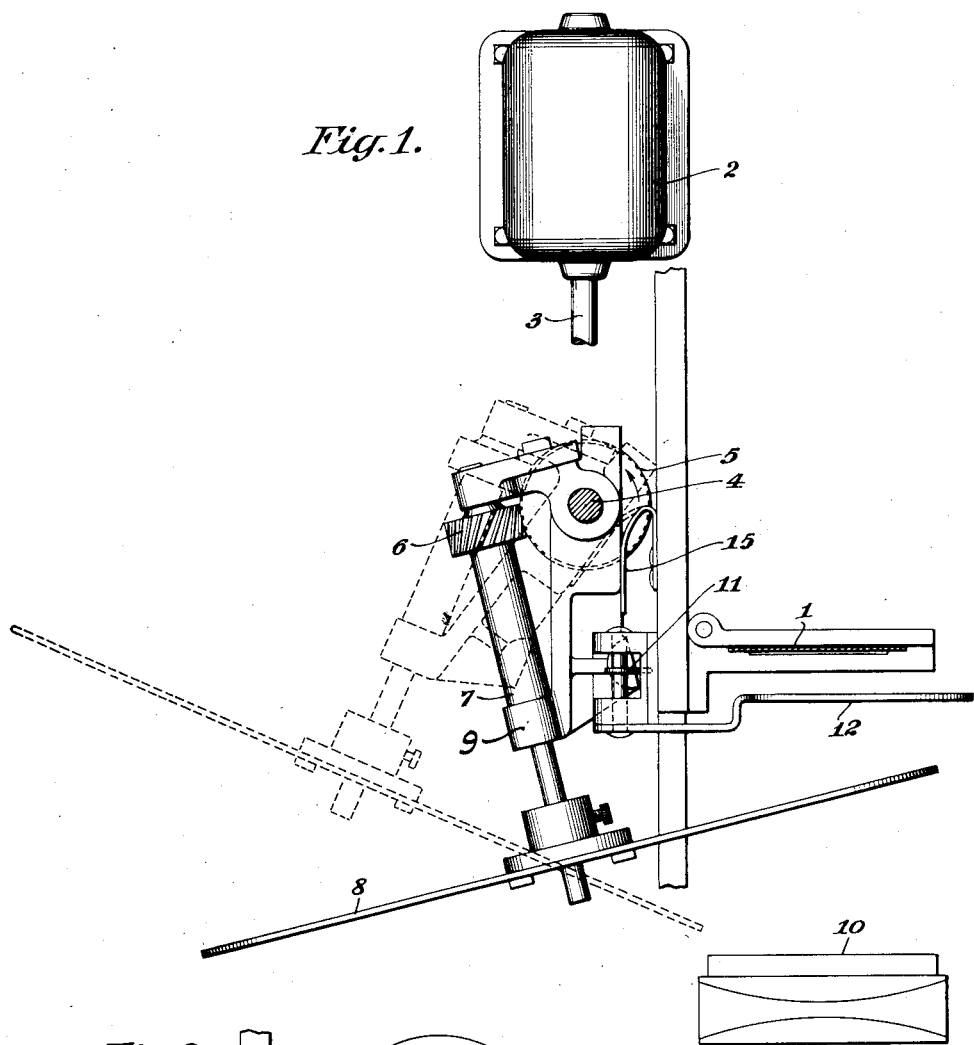
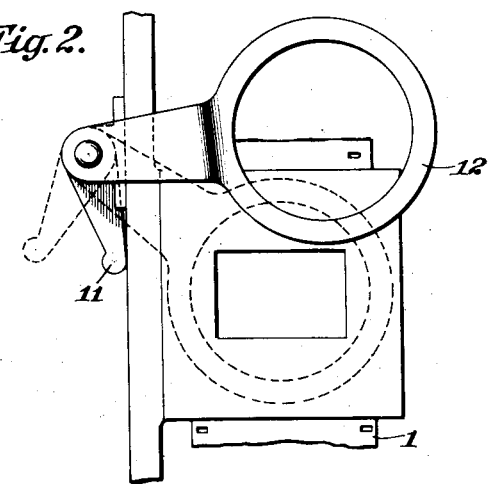
INVENTOR:
Harold H. V. Stanley.
BY
HIS ATTORNEY Patented Aug. 20, 1935

2,012,145

UNITED STATES PATENT OFFICE 2,012,145

CINEMATOGRAPH APPARATUS

Harold Herbert Vernon Stanley, Hayes, England, assignor to Electric & Musical Industries, Ltd., a corporation of Great Britain Application August 25, 1932, Serial No. 630,342
In Great Britain August 31, 1931

19 Claims. (Cl. 88—19.3)

The present invention relates to cinematograph apparatus, and more particularly to that type of apparatus which involves the use of an intermittently moving film.

In one form of known cinematograph apparatus, the film is drawn through a steady beam of light with an intermittent motion while the light is projected through the film onto a suitably placed viewing screen. In order to obtain good reproduction, the film is screened while it is in motion by means of a uniformly rotating shutter which is inserted in the path of the beam of light and which comprises a circular plate of alternate opaque and transparent sectors. Such a shutter may be called a "flicker shutter" and is mounted upon a shaft which is rotated at such speed that the film is uncovered while stationary and screened while in motion. Frequently, the shutter and the film are driven, through suitable gearing, from the same motor.

If it be desired to hold the film stationary in the beam of light and to project one picture upon the screen for a comparatively long time, means must be provided for ensuring that the rotating flicker shutter is not brought to rest with an opaque sector covering the projecting beam of light, and for ensuring that the film does not become overheated and so catch fire. With this object in view, it has already been proposed to control the motion of a heat resisting screen into and out of the projecting beam of light by means of centrifugal force. It has also been proposed to hinge the opaque blades of a flicker shutter upon a rotatable shaft, so that when rotating, the blades are held out into the projecting beam of light under the action of centrifugal force, and when stationary, they collapse upon the shaft out of the way of the beam of light.

According to the present invention, in cinematograph projecting apparatus comprising a rotatable flicker shutter, means are provided for automatically displacing the axis of the shutter and thereby moving the shutter into and out of the path of the projecting beam of light when the film driving mechanism commences and ceases, respectively, to operate.

A preferred form of the invention will now be described, reference being made to the accompanying drawing in which Fig. 1 is a plan view of a part of a cinematographic picture projector constructed in accordance with the present invention, and Fig. 2 is a view, in elevation, of a part of the apparatus illustrated in Fig. 1.

A film 1 is drawn through a cinematograph apparatus by means of a motor 2 which is of a type adapted to run at very constant speed. The shaft 3 of the motor, which is horizontally disposed, drives an intermittently rotating film driving sprocket (not shown) through suitable gearing and drives a vertical shaft 4 through a pair of bevel gear wheels (not shown). To the vertical shaft 4 is fixed one of a pair of helical gear wheels 5 and 6, the second being fixed to a shaft 7 which carries a flicker shutter 8. The shutter shaft 7 is rotatably mounted in bearings carried by a bracket 9 which itself is rotatable about the axis of the vertical shaft 4. The teeth of the two helical wheels are preferably cut at angles of 40° and 50°, respectively, so that the axes of the vertical shaft 4 (which may be called the driving shaft) and the flicker shutter shaft 7 are at right angles. When the vertical driving shaft 4 commences to rotate, the shutter shaft 7 rotates with it about its own axis and also experiences an axial thrust which tends to rotate the shutter shaft 7 and the bracket 9 in which it is mounted about the axis of the vertical driving shaft 4. Similarly, when the driving shaft 4 ceases to rotate, an axial thrust is exerted upon the shutter shaft 7 in the opposite direction and the latter thus tends to rotate, with the bracket 9, about the axis of the vertical shaft 4 in the reverse direction. The actual extent to which the flicker shutter shaft 7 is allowed to swing round the driving shaft 4 may be limited by suitably placed stops (not shown). It will be apparent that there will be no axial thrust upon the shutter shaft 7 when the driving shaft 4 ceases to rotate unless the angular retardation of the latter is greater than that of the former. In other words, the shutter shaft 7 must overrun the driving shaft 4 as a result of the latter being quickly brought to rest.

In consequence of the rotation of the shaft 7 about the driving shaft 4, the flicker shutter 8 may occupy two positions, one of which is shown by the full lines and the other by the broken lines. By suitably proportioning the apparatus, it may be arranged that when the driving shaft 4 commences to rotate, the flicker shutter 7 is swung into the path of the projecting beam of light, and when the driving shaft ceases to rotate the shutter is swung out of the beam of light. If desired, the motion of the shutter out of the beam of light may be assisted by a suitably mounted spring 15 of such strength that it will still allow the shutter to be swung into the beam of light when the shaft 4 commences to rotate.

In order that the film, when stationary, shall not be overheated by the uninterrupted beam of light which is focussed upon the film by the lens combination 10, it is arranged that the shutter 8, as it swings out of the beam of light, releases its pressure against a lever 11 which holds a heat resisting screen 12 of mica in a position just above the beam of light. On being thus released, the safety screen, or heat filter, 12 drops into the path of the light and occupies the position shown by the broken lines. When the driving shaft 4 commences to rotate once again, the flicker shutter 8 swings into the beam of light, presses against the lever 11, and forces the safety screen 12 up and out of the beam of light.

To those skilled in the art, there will at once be apparent many modifications of the apparatus described above within the scope of the present invention. For example, the helical gear wheels may be cut at angles other than 40° and 50°, and the flicker shutter shaft need not be inclined to the driving shaft at 90°, while bevel or other gear wheels may be used in place of the helically cut wheels described herein. Furthermore, although I have illustrated and described a shutter mounting which is movable to the dotted line position under the influence of energy stored therein, it should be apparent that the device may be controlled in any other suitable manner. My invention, therefore, is not to be restricted except insofar as is necessitated by the prior art and by the spirit of the appended claims.

I claim as my invention

1. In motion picture apparatus, a shaft carrying a flicker-shutter, freely pivoted means for rotatably supporting the shaft, a second shaft, fixed means for rotatably supporting the second shaft, and cooperative means on both of said shafts for causing pivotal movement of the shutter-carrying shaft relative to the second shaft in a plane normal to the axis of the second shaft when the operating condition of the second shaft is altered.

2. Apparatus according to claim 1 wherein said cooperative means comprises a pair of helical gears, one on each shaft, said gears being so arranged that a change in the speed of said second shaft will produce an axial thrust on said shutter shaft.

3. In motion picture apparatus, a shaft carrying a flicker shutter, means defining a light path through the apparatus, freely pivoted means for rotatably supporting the shaft in a plane parallel the axis of the light path, means for causing the pivoted means to rotate about its support in said plane to interpose the shutter into the light-path and to withdraw the shutter from the light-path, a heat-filter, and means actuated in response to movement of the pivoted means to interpose said filter in the light path when the shutter is moved out of the light-path and to withdraw the filter from the light-path when the shutter is moved thereinto.

4. The invention set forth in claim 3 characterized in that means are provided whereby the movement of the pivoted means is automatically controlled by the condition of operation of the apparatus.

5. The invention set forth in claim 3 characterized in that means are provided for pivotally supporting the heat-filter for movement transverse of the light-path.

6. The invention set forth in claim 3 characterized in that the heat filter is carried by a frame pivotally supported for movement transverse of the light path, and further characterized in that the center of gravity of the frame is below the point of support thereof.

7. The invention set forth in claim 3 characterized in that the heat-filter is carried by a pivotally mounted frame provided with an extension disposed in the path of movement of the pivoted shaft-supporting means.

8. The invention set forth in claim 3 characterized in that means are provided for resiliently urging the pivoted shaft-supporting means away from the light-path, whereby, when the shaft is not rotating, the shutter will be moved out of the light-path.

9. In motion picture apparatus, a driving shaft having a helical gear mounted thereon, a bearing device freely pivoted on said shaft, a shutter carrying shaft rotatably carried by said bearing device, a helical gear on said shutter carrying shaft meshing with the first mentioned gear, and a plurality of means for limiting the extent of pivotal movement of the bearing device whereby movement through a predetermined angle is imparted to the bearing device upon rotation of the driving shaft in a given direction.

10. The invention set forth in claim 9, characterized in that resilient means are provided for urging the bearing device toward a movement-limiting means upon cessation of rotation of the driving shaft in the given direction.

11. The invention set forth in claim 9, characterized in that a pivotally mounted heat-filter carrying frame is provided and further characterized in that a portion of the frame is interposed in the path of movement of the bearing device.

12. In motion picture apparatus, a flicker-shutter, means defining a light path through the apparatus, a heat-filter mounted for movement into and out of the light-path, means including a pivotally supported shutter shaft associated with said shutter and operable in response to a change in operating condition of said apparatus for bodily moving the shutter in its entirety into and out of said light-path, and means responsive to movement of the shutter for determining the position of the heat-filter.

13. In motion picture apparatus including driving mechanism, means defining a light path through the apparatus, a pivotally supported shutter mounting, a shutter shaft rotatably supported thereon, a shutter mounted on said shaft and adapted to occupy a position in said light path, and means interconnecting said shutter shaft and said driving mechanism for rotating said shutter, said means being also effective to exert an axial thrust on said shutter shaft to automatically displace the axis of said shutter with respect to said light path upon a change of operation of said driving mechanism.

14. In motion picture apparatus including driving mechanism, means defining a light path through the apparatus, a pivotally supported shutter mounting, a shutter shaft rotatably supported thereon, a shutter mounted on said shaft and adapted to occupy a position in said light path, and means interconnecting said shutter shaft and said driving mechanism for rotating said shutter, said means being also effective to exert an axial thrust on said shutter shaft to automatically displace the axis of said shutter with respect to said light path either upon commencement of operation or upon cessation of operation of said driving mechanism.

15. In motion picture apparatus including driving mechanism, means defining a light path through the apparatus, a pivotally supported shutter mounting, a shutter shaft rotatably supported thereon, a shutter mounted on said shaft and adapted to occupy a position in said light path, and means interconnecting said shutter shaft and said driving mechanism for rotating said shutter, said means being also effective, upon commencement of operation of said driving mechanism, to exert a force on said shutter shaft in a direction such as to automatically move said shutter into said light path.

16. In motion picture apparatus including driving mechanism, means defining a light path through the apparatus, a pivotally supported shutter mounting, a shutter shaft rotatably supported thereon, a shutter mounted on said shaft and adapted to occupy a position in said light path, and means interconnecting said shutter shaft and said driving mechanism for rotating said shutter, said means being also effective, upon commencement of operation of said driving mechanism, to exert a force on said shutter shaft in a direction such as to automatically move said shutter into said light path and to exert a force on said shutter shaft in the opposite direction whereby to automatically remove said shutter from said light path upon cessation of operation of said driving mechanism.

17. In motion picture apparatus, means defining a light path, a prime mover, a pivotally supported shaft, a flicker shutter on said shaft, means for applying torque and end thrust to said shaft from said prime mover, and means for utilizing the end thrust, when the operation of the apparatus is initiated, for causing the shutter to bodily move into the light path.

18. In motion picture apparatus, a prime mover, a rotatably and pivotally supported shaft, a flicker shutter on said shaft, means for deriving two angularly related forces from the prime mover, and means for utilizing one of said forces to impart translatory movement to the shaft upon initiation of operation of the prime mover.

19. In motion picture apparatus, a rotatably and pivotally supported shaft, a flicker shutter on said shaft, a prime mover connected to said shaft for delivering power thereto, and means whereby, after cessation of the application of power to the shaft, the kinetic energy stored in the shutter is effective to develop a force which causes translatory movement of the shaft.

HAROLD HERBERT VERNON STANLEY.